(No Model.)
J. HARRIS.
CAR WHEEL.
No. 469,919. Patented Mar. 1, 1892.
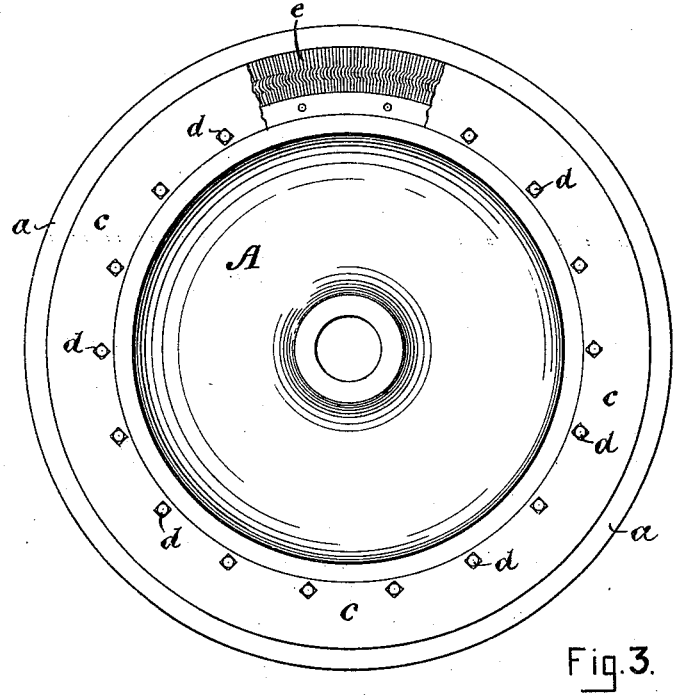
Fig. 1.
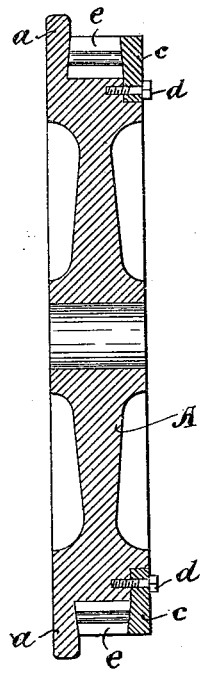
Fig. 2.
Fig. 3.
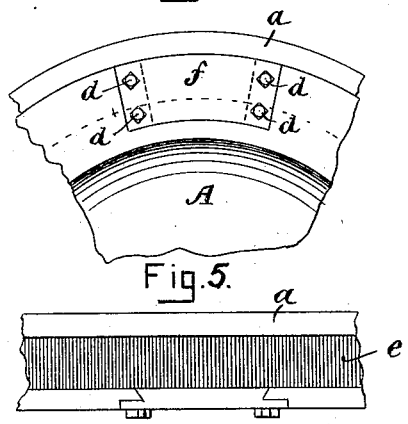
Fig. 4.
Fig. 5.
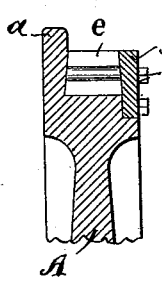
Fig. 6.
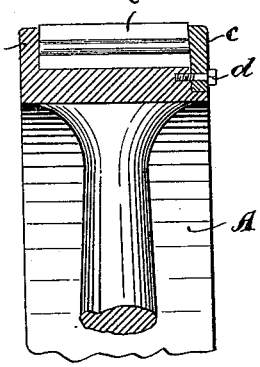
Fig. 7.
Witnesses.
Winfred G. Kerwin.
John J. Moore.
Inventor.
Joseph Harris
by Edwin Plauta.
Attorney.
THE NORRIS PETERS CO., PHOTO-LITHO., WASHINGTON, D. C.

United States Patent Office.

JOSEPH HARRIS, OF BOSTON, MASSACHUSETTS.

CAR-WHEEL.

SPECIFICATION forming part of Letters Patent No. 469,919, dated March 1, 1892.

Application filed May 4, 1891. Serial No. 391,460. (No model.)

*To all whom it may concern:*

Be it known that I, JOSEPH HARRIS, a citizen of the United States, residing at Boston, in the county of Suffolk and State of Massachusetts, have invented certain new and useful Improvements in Driving or Traction Wheels, of which the following, taken in connection with the accompanying drawings, is a specification.

The object of my invention is to produce a driving or traction wheel particularly applicable for locomotives, so that the wheel will firmly grip the rail and not slip.

The invention consists of a wheel the tread or that portion of which that forms its operating-surface is composed of a series of radial plates, which plates are held in a dovetail groove formed in the periphery of the wheel, as hereinafter fully described, and pointed out in the claims.

Referring to the accompanying drawings, Figure 1 represents a side view of a locomotive driving or traction wheel embodying my invention, a portion of the ring being shown broken away to expose the edge of the plates. Fig. 2 is a section taken on the line $x\ x$ of Fig. 1. Fig. 3 is a view of one of the radial plates. Figs. 4, 5, and 6 are respectively a side view, plan, and section of a portion of a wheel, showing a modified manner of retaining the radial plates in place. Fig. 7 is a section of a portion of a driving wheel or pulley having radial plates embodying my invention.

A represents a wheel having a flange $a$ on one side, which extends some distance beyond the body of the wheel, and a ring $c$ on the other side, the body of the wheel being recessed to receive the inner edge of the ring, which is secured thereto by bolts $d$, the space between the ring $c$ and the flange $a$ being of dovetail form, as shown. In this space around the entire circumference of the wheel are arranged a number of steel plates $e$, set edgewise, so as to radiate to the center of the wheel. The sides of each of these plates are of dovetail form, and they are bent in the center to form a portion of a circle, as will be best seen in Fig. 3, so that when arranged in place they will fit into and against each other and will be held by the dovetail groove formed by the flange $a$ and the ring $c$. The plates $e$ are first put into position around the circumference of the wheel, and the ring $c$ is then laid on and the bolts $d$ inserted and tightened up, thereby firmly holding the plates $e$ in place.

Instead of employing a ring $c$, as before described, the wheel might be formed with a dovetail groove around its circumference, a small portion on the inner side being cut away, so as to allow for the insertion of the plates $e$, which would be slipped round into place and when the last plate had been inserted the cut-out portion would be covered by a dovetail piece $f$, as shown in Figs. 4, 5, and 6, which could be put in from the top and then secured by four bolts, as shown.

When employed for a traction-wheel for locomotives, the edges of the plates $e$ would not project beyond the ordinary tread or the edge of the ring $c$; but in a wheel for ordinary roads or a pulley for driving a belt the edge of the plates would project a short distance, as shown in Fig. 7, so that they would have a firm grip upon the road or belt.

It will be seen that a wheel thus constructed presents a wearing-surface consisting of the edges of a series of plates, thus rendering the wheel very durable, and should the plates become worn they can readily be removed and new plates replaced, thus making the wheel as good as new, and by the employment of the plates and their peculiar shape—viz., being rounded in the center—they are rendered somewhat elastic, even though packed in a solid body around the wheel, thereby affording a good grip upon the rail or other substance with which they are in contact and preventing all liability of slipping.

What I claim as my invention is—

1. A wheel the tread or operating-surface of which is composed of a series of thin metal plates placed side by side transversely of the tread and held in a groove in the periphery of the wheel, substantially as set forth.

2. A wheel having a flange the inner face of which slopes outwardly and a ring on the opposite side, the inner face of which also slopes outwardly, thus forming a dovetail groove around the periphery, and thin metal plates arranged in said dovetail groove, so as to stand transversely of the tread and form the operating-surface of the wheel, substantially as set forth.

3. A series of thin metal plates the sides of which are of dovetail form, each plate having a rounding projection at or about its center, so that the plates will fit against and within each other when arranged around the wheel, so as to stand transversely of the tread, said plates being held in a dovetail groove in the periphery of the wheel, substantially as set forth.

In testimony whereof I have signed my name to this specification, in the presence of two subscribing witnesses, on this 25th day of April, A. D. 1891.

JOSEPH HARRIS.

Witnesses:
GEORGE DENNISON,
EDWIN PLANTA.